(12) United States Patent
Lai et al.

(10) Patent No.: US 11,114,934 B2
(45) Date of Patent: Sep. 7, 2021

(54) POWER SUPPLY DEVICE AND OPERATION METHOD THEREOF

(71) Applicant: DELTA ELECTRONICS, INC., Taoyuan (TW)

(72) Inventors: Wei-Hsun Lai, Taoyuan (TW); Wei-Cheng Lin, Taoyuan (TW); Po-Cheng Chiu, Taoyuan (TW); Chien-Yu Wang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/747,543

(22) Filed: Jan. 21, 2020

(65) Prior Publication Data
US 2021/0006150 A1      Jan. 7, 2021

(30) Foreign Application Priority Data
Jul. 4, 2019    (CN) .......................... 201910600223.4

(51) Int. Cl.
*H02M 1/34*    (2007.01)

(52) U.S. Cl.
CPC .............. *H02M 1/34* (2013.01); *H02M 1/344* (2021.05)

(58) Field of Classification Search
CPC .... H02M 1/32; H02M 1/34; H02M 2001/342; H02M 2001/344; H02M 2001/346; H02M 2001/348
See application file for complete search history.

(56) References Cited

U.S. PATENT DOCUMENTS

| | | | |
|---|---|---|---|
| 5,584,974 A * | 12/1996 | Sellers | H01J 37/34 204/192.12 |
| 5,810,982 A | 9/1998 | Sellers | |
| 5,896,284 A * | 4/1999 | Murasato | H03K 17/08142 363/124 |
| 7,292,045 B2 | 11/2007 | Anwar et al. | |
| 10,224,808 B2 * | 3/2019 | Torii | H02M 1/14 |
| 2006/0028186 A1 * | 2/2006 | Yan | H02M 3/155 323/225 |
| 2014/0313627 A1 | 10/2014 | Li et al. | |

FOREIGN PATENT DOCUMENTS

| | | |
|---|---|---|
| CN | 207038478 U | 2/2018 |
| TW | 329016 B | 4/1998 |

* cited by examiner

*Primary Examiner* — Adolf D Berhane
(74) *Attorney, Agent, or Firm* — CKC & Partners Co., LLC (57) ABSTRACT

A power supply device includes an inductor, a switch, a power supply, and a snubber circuit. A first terminal of the switch is coupled to a first terminal of the inductor. A first terminal of the power supply is coupled to a second terminal of the witch. A first terminal of the snubber circuit is coupled to the first terminal of the switch at a first voltage output terminal. A second terminal of the snubber circuit is electrically coupled to a second terminal of the power supply at a second voltage output terminal, in which the inductor, the switch, the power supply, and the snubber circuit are configured to cooperate to generate an output voltage at the first voltage output terminal and the second voltage output terminal.

19 Claims, 6 Drawing Sheets

POWER SUPPLY DEVICE AND OPERATION METHOD THEREOF

RELATED APPLICATIONS

The present application claims priority to China Application Serial Number 201910600223.4 filed on Jul. 4, 2019, which is herein incorporated by reference in its entirety.

BACKGROUND

Description of Related Art

In the plasma system (such as sputtering, etching, etc.) of the current semiconductor manufacture process, the current technology implements a negative voltage power supply and a dependent positive voltage power supply in equal proportions thereto as an output pulse power supply to periodically suppress the arc generated on the surface of the target. However, for the application in which the voltage level of the positive voltage source needs to be adjusted to meet the requirements of different processes and sputtering materials, the output positive voltage with fixed voltage ratio and pulse frequency, provided in conventional art, cannot effectively suppress the generation of the arc and cause slow sputtering rate and poor film quality. Moreover, while utilizing the pulse signal to switch the switch, a proper snubber circuit is required to absorb the energy of surge during switching.

SUMMARY

One aspect of the present disclosure is to provide a power supply circuit. The power supply circuit includes an inductor, a switch, a power supply, and a snubber circuit. A first terminal of the switch is coupled to a first terminal of the inductor. A first terminal of the power supply is coupled to a second terminal of the switch. A first terminal of the snubber circuit is coupled to the first terminal of the switch at a first voltage output terminal, and a second terminal of the snubber circuit is coupled to a second terminal of the power supply at a second voltage output terminal. The inductor, the switch, the power supply, and the snubber circuit are configured to cooperate to generate an output voltage between the first voltage output terminal and the second voltage output terminal.

Another aspect of the present disclosure is to provide a power supply circuit. The power supply circuit includes a switch, a first inductor coupled to the switch, a power supply coupled to the switch, an energy storage element coupled to the switch at a first voltage output terminal, a first surge suppressor coupled to the energy storage element at a node, and a second surge suppressor. The first inductor is configured to receive an output voltage from a voltage signal converter and to generate an energy storage voltage. The power supply is configured to provide a supply voltage. A first terminal of the second surge suppressor is coupled to the energy storage element at the node. The first surge suppressor is electrically coupled to, through a second terminal of the second surge suppressor, the power supply at a second voltage output terminal. When the switch is switched to be turned on, the power supply, the energy storage element, the switch, and the first surge suppressor form a first loop in order to absorb a reverse surge generated while the switch is switched, and the power supply is further configured to output the supply voltage at the first voltage output terminal and the second voltage output terminal. When the switch is switched to be turned off, the energy storage element and the second surge suppressor form a second loop to absorb a forward surge generated while the switch is switched, and the first inductor is further configured to output the energy storage voltage between the first voltage output terminal and the second voltage output terminal.

Another aspect of the present disclosure is to provide an operation method of a power supply circuit, the method comprising the following steps: by an inductor, absorbing an output voltage of a voltage signal convertor to output a first voltage signal; and controlling a turn-on state of a switch to selectively output the first voltage signal as an output voltage, or output from an adjustable power supply a second voltage signal as the output voltage, a polarity of the second voltage signal being opposite to the first voltage signal, in which when the switch is turned off, an energy storage element and a first surge suppressor are configured to form a first loop to suppress a reverse surge generated while outputting the first voltage signal, and when the switch is turned on, the energy storage element, the switch and a second surge suppressor are configured to form a second loop to suppress a forward surge while outputting the second voltage signal.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The spirit of the present disclosure will be discussed in the following drawings and detailed description, and those of ordinary skill in the art will be able to change and modify the teachings of the present disclosure without departing from the spirit and scope of the present disclosure.

It should be understood that, in this document and the following claims, when an element is referred to as being "connected" or "coupled" to another element, it can be directly connected or coupled to another element, or there may be an intervening component. In contrast, when an element is referred to as being "directly connected" or "directly coupled" to another element, there is no intervening element. In addition, "electrically connected" or "connected" may also be used to indicate that two or more elements cooperate or interact with each other.

It should be understood that, in this document and the following claims, the terms "first" and "second" are to describe the various elements. However, these elements should not be limited by these terms. These terms are used to distinguish one element from another. For example, a first element may be termed a second element. Similarly, a second element may be termed a first element without departing from the spirit and scope of the embodiments.

It should be understood that, in this document and the following claims, the terms "include," "comprise," "having" and "has/have" are used in an open-ended fashion, and thus should be interpreted to mean "include, but not limited to."

It should be understood that, in this document and the following claims, the term "and/or" includes any and all combinations of one or more of the associated listed items.

It should be understood that, in this document and the following claims, unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Any element in the claim should not be construed as a means of function, unless it is explicitly stated that the device is used to perform a particular function, or that the steps are used to perform a particular function.

Figure 1:
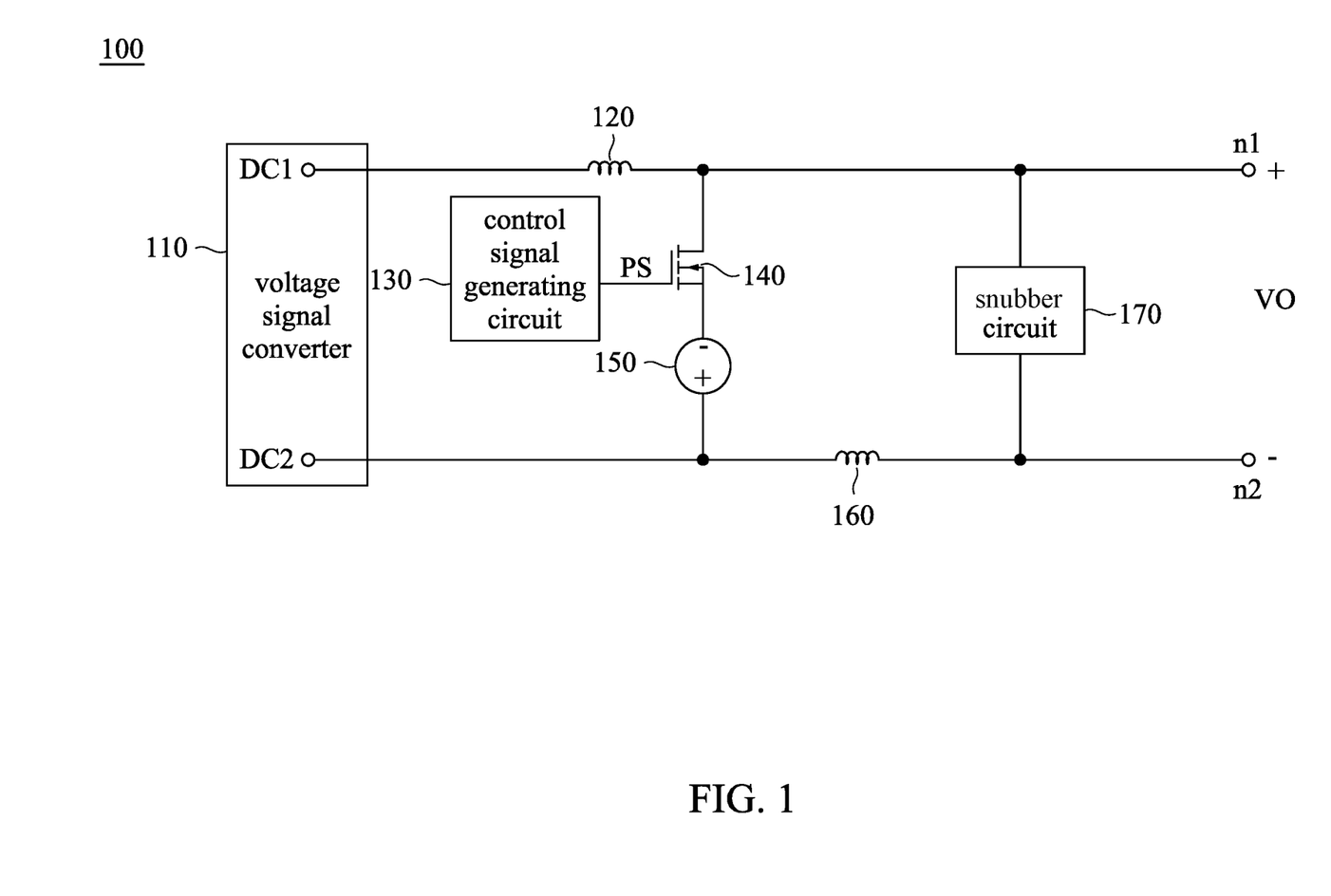
FIG. 1 is a schematic diagram of a power supply device, in accordance with some embodiments of the present disclosure.

Reference is now made to FIG. 1. FIG. 1 is a schematic diagram of a power supply device 100, in accordance with some embodiments of the present disclosure. As shown in FIG. 1, the power supply device 100 includes a voltage signal converter 110, an inductor 120, a control signal generating circuit 130, a switch 140, a power supply 150, an inductor 160, and a snubber circuit 170. In the connection relationship, the voltage signal converter 110 includes converter output terminals DC1, DC2. A first terminal of the inductor 120 is coupled to the converter output terminal DC1, and a second terminal of the inductor 120 is coupled to a first terminal of the switch 140 and a first terminal of the snubber circuit 170 at a voltage output terminal n1. A second terminal of the switch 140 is coupled to a first terminal of the power supply 150. A control terminal of the switch 140 is coupled to the control signal generating circuit 130. A second terminal of the power supply 150 is coupled to a first terminal of the inductor 160 and the converter output terminal DC2. A second terminal of the inductor 160 is coupled to a second terminal of the snubber circuit 170 at a voltage output terminal n2. In some embodiments, the inductor 160 can not be required in the power supply device 100. In this configuration, the second terminal of the power supply 150 can be coupled directly to the second terminal of the snubber circuit 170 at the voltage output terminal n2. The voltage signal converter 110 may be a DC-to-DC converter, an AC-to-DC converter, or any device being configured to implement to convert an input voltage to a different DC power supply. The switch 140 may be a transistor or any element being able to conduct or disconnect the first terminal and the second terminal of the switch. The power supply 150 can be any DC power supply with adjustable output voltage level, in which the polarity of the voltage output from the power supply 150 to the voltage output terminals n1, n2 is opposite to the polarity of the voltage output from the voltage signal converter 110 to the voltage output terminals n1, n2.

In the operation, in some embodiments, the inductor 120, the switch 140, the power supply 150 and the snubber circuit 170 are configured to cooperate to generate an output voltage VO at the voltage output terminal n1 and the voltage output terminal n2. For example, the inductor 120 is configured to receive an output voltage from the voltage signal converter 110 and to generate an energy storage voltage. The power supply 150 is configured to provide a supply voltage having a polarity opposite to of the energy storage voltage. The control signal generating circuit 130 is configured to generate a control signal PS to the switch 140, so that the switch 140, in response to the control signal PS, switches a turn-on state to selectively generate one of the energy storage voltage and the supply voltage as the output voltage VO at the voltage output terminal n1 and the voltage output terminal n2. In some embodiments, the control signal PS may be a pulse width modulation (PWM) signal. The control signal generating circuit 130 may, by adjusting a frequency and a duty cycle of the control signal PS, modify a frequency, a duty cycle, etc. of the output voltage VO. Since the polarity of the energy storage voltage and the supply voltage are opposite, when the switch 140 is switched, the output voltage VO changed from a negative voltage to a positive voltage, or from a positive voltage to a negative voltage, which will produce a surge voltage, and the snubber circuit 170 is configured to absorb the surge voltage.

Figure 2:
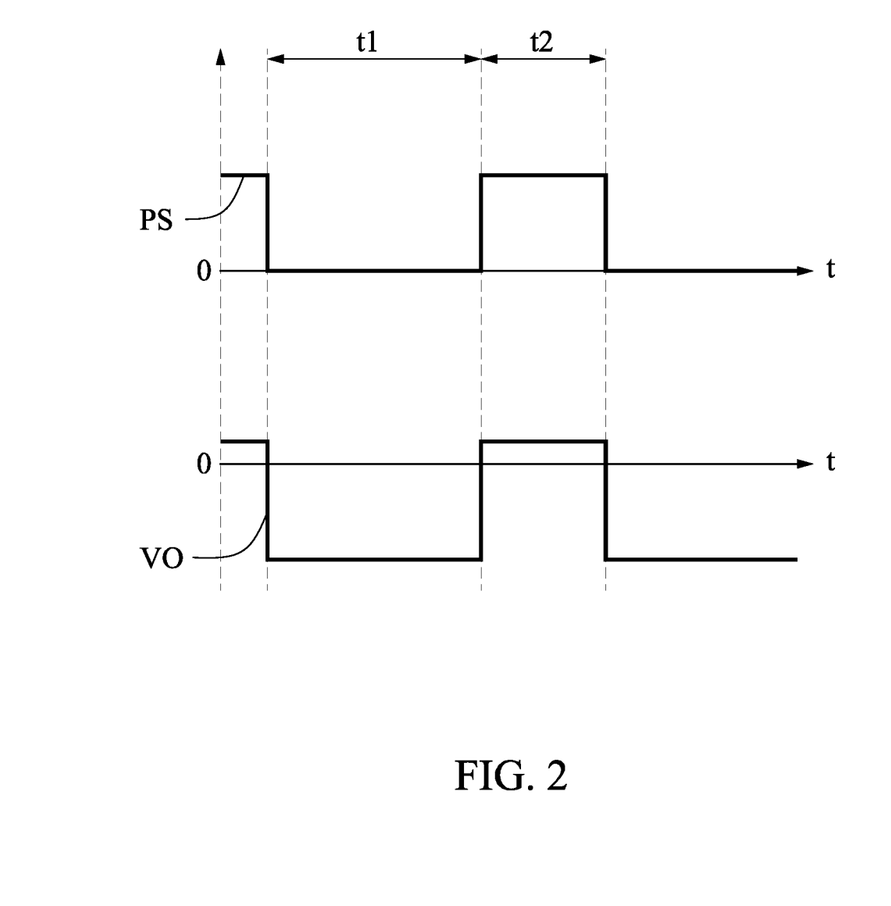
FIG. 2 is a schematic diagram illustrating a control signal and an output voltage, in accordance with some embodiments of the present disclosure.
Figure 3:
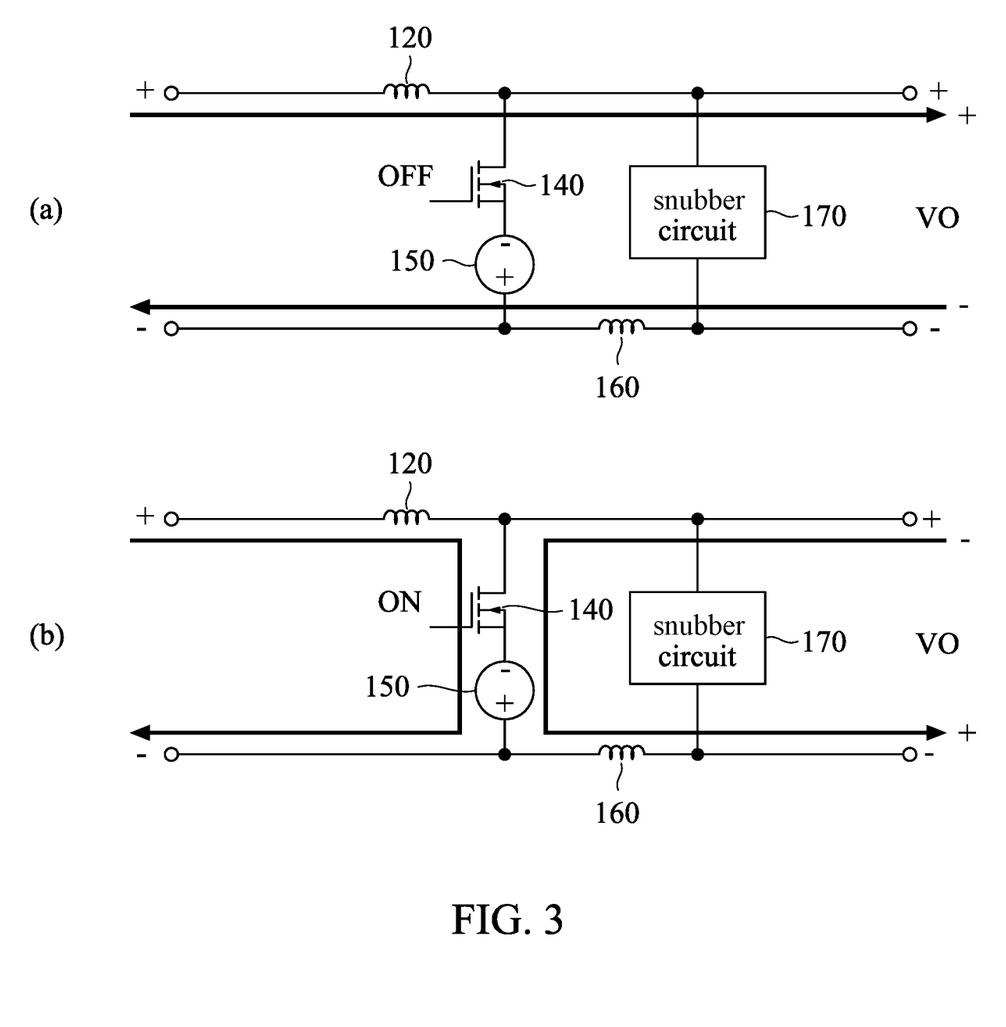
FIG. 3 is a schematic diagram illustrating operations of a power supply device, in accordance with some embodiments of the present disclosure.

Reference is now made to FIG. 2 and FIG. 3 together. FIG. 2 is a schematic diagram illustrating the control signal PS and the output voltage VO, in accordance with some embodiments of the present disclosure. FIG. 3 is a schematic diagram illustrating operations of the power supply device 100, in accordance with some embodiments of the present disclosure. For the sake of understanding, the same elements in FIG. 3 as those in FIG. 1 will be denoted by the same reference marks. The specific operation of similar elements that have been discussed in detail in the above paragraphs is omitted here for the sake of brevity, unless there is a need to explain the cooperative relationship with the elements shown in FIG. 3. In addition, for ease of explanation, the voltage signal converter 110 and the control signal generating circuit 130 are not shown in FIG. 3, and the connection relationship is as shown in the embodiment in FIG. 1.

As shown in FIG. 2, taking the voltage signal converter 110 providing the negative voltage as the output voltage VO and the power supply 150 providing the positive voltage as the output voltage VO as an example, accompanying with embodiments shown in FIG. 3(a), at the time interval t1, the control signal PS has a low level, such that the switch 140 is correspondingly turned off. Thus, the inductor 120 outputs the energy storage voltage of the negative voltage as the output voltage VO. Likewise, as the embodiments shown in FIG. 2 and FIG. 3(b), at the time interval t2, the control signal PS has a high level, such that the switch 140 is correspondingly turned on. Thus, the power supply 150 outputs the supply voltage of the positive voltage as the output voltage VO. As shown in FIG. 2, the output voltage VO has a positive voltage level.

In some embodiments, the power supply 150 can adjust, according to actual application, the positive voltage level of the output voltage VO as depicted in FIG. 2. For example, the output voltage level of some positive voltage power supplies configured in sputtering power supply systems for semiconductor processes can be adjusted based on the applied process or the combination of materials, such that the positive ions adsorbed on the target are released by being repelled by the output voltage VO, with a positive voltage, applied to the target. Therefore, the probability of arcing in the cavity is reduced, and the surface of the film to be plated is prevented from being covered with fine pits, thereby improving the sputtering quality.

Figure 4:
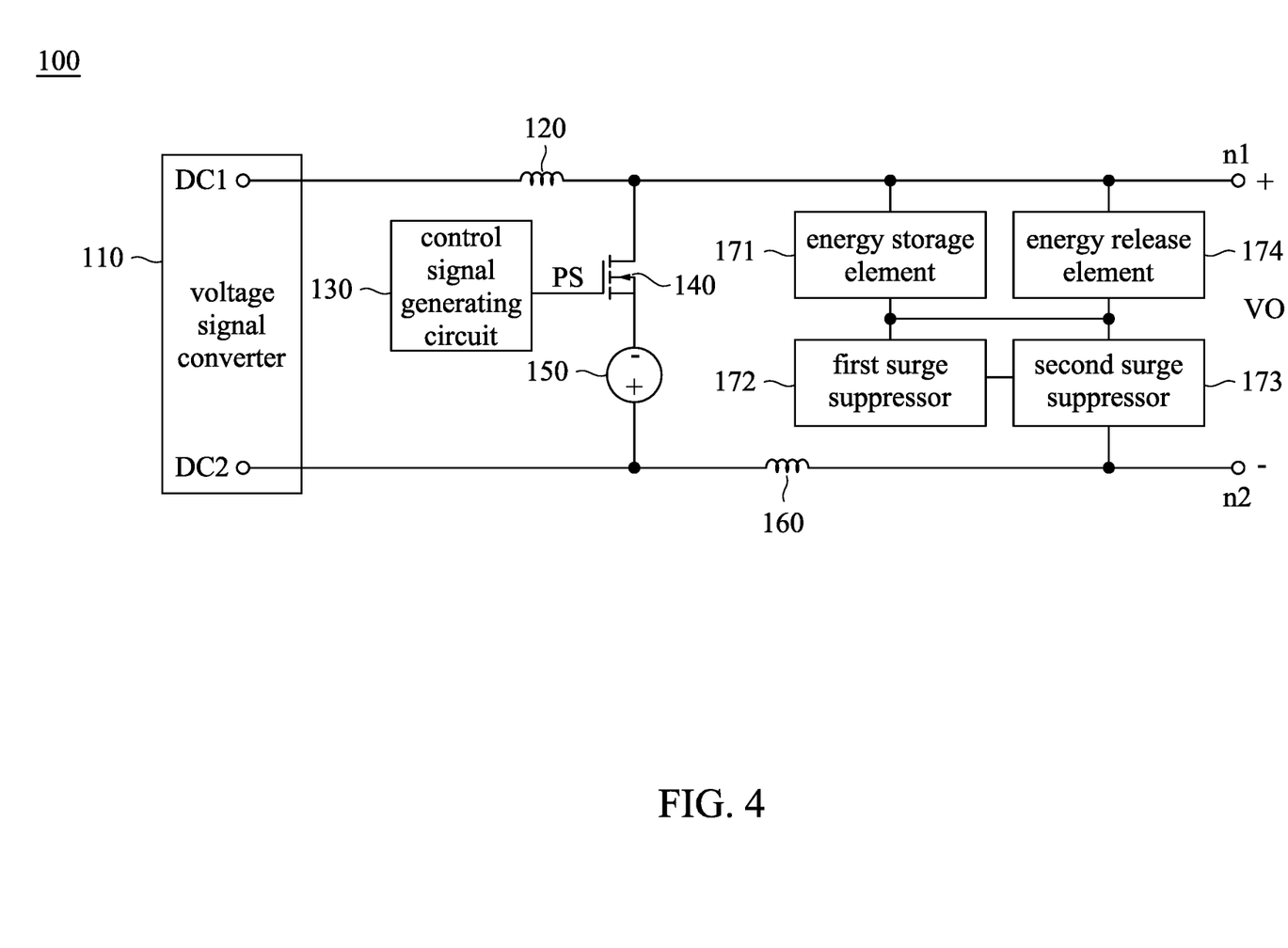
FIG. 4 is a schematic diagram of a power supply device, in accordance with some other embodiments of the present disclosure.

Reference is now made to FIG. 4. FIG. 4 is a schematic diagram of the power supply device 100, in accordance with some other embodiments of the present disclosure. For the sake of understanding, the same elements in FIG. 4 as those in FIG. 1 will be denoted by the same reference marks. The specific operation of similar elements that have been discussed in detail in the above paragraphs is omitted here for the sake of brevity, unless there is a need to explain the cooperative relationship with the elements shown in FIG. 4. As shown in FIG. 4, in some embodiments, the snubber circuit 170 includes an energy storage element 171, a first surge suppressor 172, a second surge suppressor 173, and an energy release element 174. A first terminal and a second terminal of the energy storage element 171 are respectively coupled to a first terminal and a second terminal of the energy release element 174. A first terminal of the first surge suppressor 172 is coupled to a second terminal of the energy storage element 171, a first terminal of the second surge suppressor 173, and a second terminal of the energy release element 174. A second terminal of the first surge suppressor 172 is coupled to a second terminal of the second surge suppressor 173. A first terminal of the energy storage element 171 and a third terminal of the second surge suppressor 173 are coupled to the voltage output terminals n1 and n2, respectively. In some embodiments, the first surge suppressor 172 can be used as a reverse surge suppressor to implement a cooperative operation to suppress the reverse surge generated while switching the power supply 150 to output the supply voltage. The second surge suppressor 173 can be used as a forward surge suppressor to implement a cooperative operation to suppress the forward surge generated while switching the inductor 120 to output the energy storage voltage.

Figure 5:
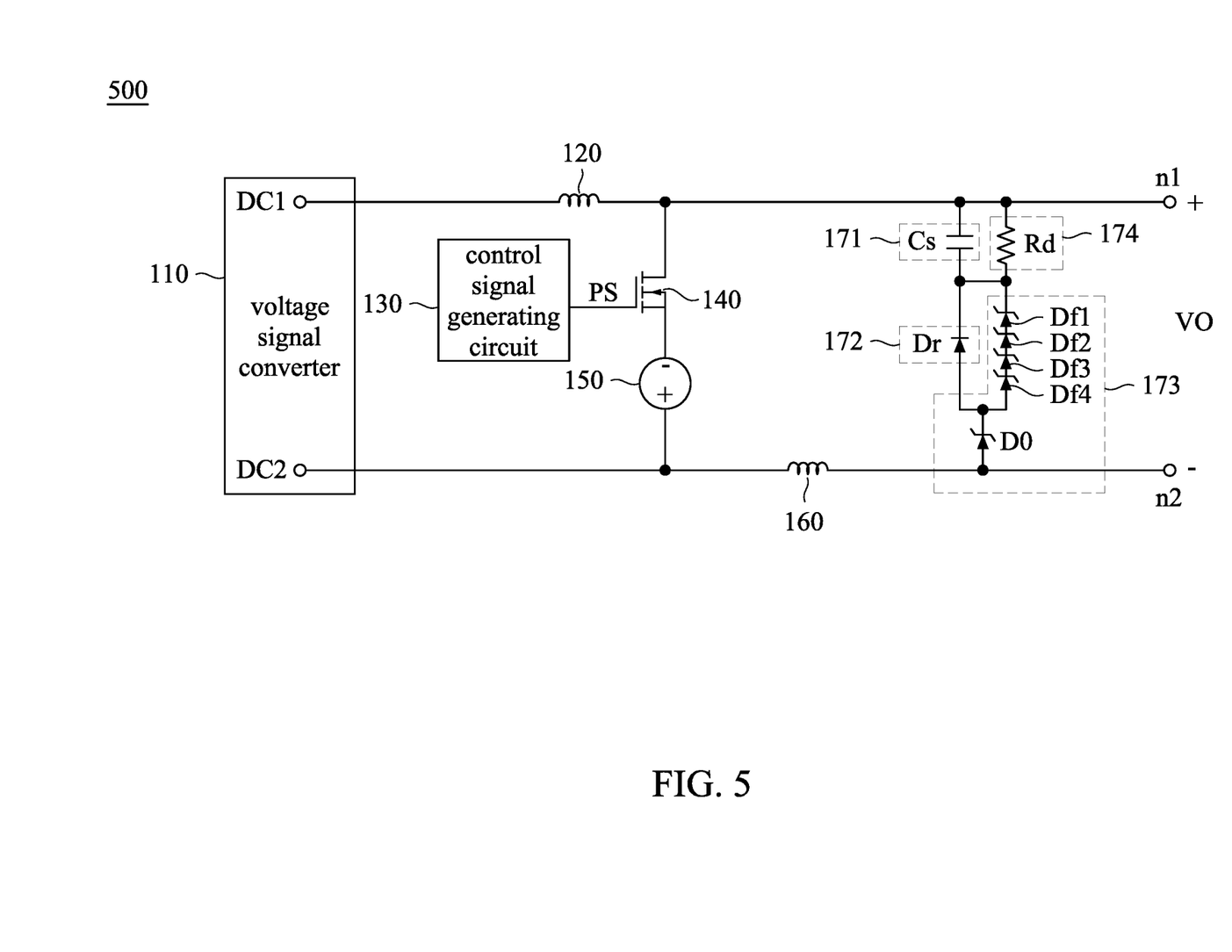
FIG. 5 is a schematic diagram of a power supply device, in accordance with some embodiments of the present disclosure.

Reference is now made to FIG. 5. FIG. 5 is a schematic diagram of a power supply device 500, in accordance with some embodiments of the present disclosure. As shown in FIG. 5, in some embodiments, the energy storage element 171 can include a capacitor Cs. The first surge suppressor 172 can include a diode Dr. The second surge suppressor 173 can include a plurality of diodes Df1-Df4 coupled to each other in series. The energy release element 174 may include a resistor Rd. Furthermore, in some embodiments, the second surge suppressor 173 may further include a diode D0. The diode D0 may be a Zener diode, a transient voltage suppress diode (TVS Diode), or any device capable to protect a circuit from the effect of surge. Specifically stated, in some embodiments, the second surge suppressor 173 includes the diode D0. In such arrangements, it is more flexible to select components for the diode Dr of the first surge suppressor 172. It is noted that, in the aforementioned embodiment of the second surge suppressor 173 including the diode D0, the first terminal of the diode D0 is as the second terminal of the second surge suppressor 173, and is coupled to the first surge suppressor 172. The second terminal of the diode D0 is as the third terminal of the second surge suppressor 172, and is electrically coupled to the power supply 150 at the voltage output terminal n2. Conversely, in some embodiments, the second surge suppressor 173 does not include the diode D0. In such arrangements, the second terminal of the second surge suppressor 173 is configured as the third terminal of the second surge suppressor 173. In other words, the second terminal (that is the third terminal) of the second surge suppressor 173, the second terminal of the first surge suppressor 172 and the power supply 150 are electrically coupled at the voltage output terminal n2. It should be noted that, the aforementioned configuration of the elements in the circuit is given as embodiments for ease of understanding the present disclosure, but the present disclosure is not limited thereto. For the sake of understanding, the same elements in FIG. 5 as those in FIG. 1 will be denoted by the same reference marks. The specific operation of similar elements that have been discussed in detail in the above paragraphs is omitted here for the sake of brevity, unless there is a need to explain the cooperative relationship with the elements shown in FIG. 5.

Figure 6:
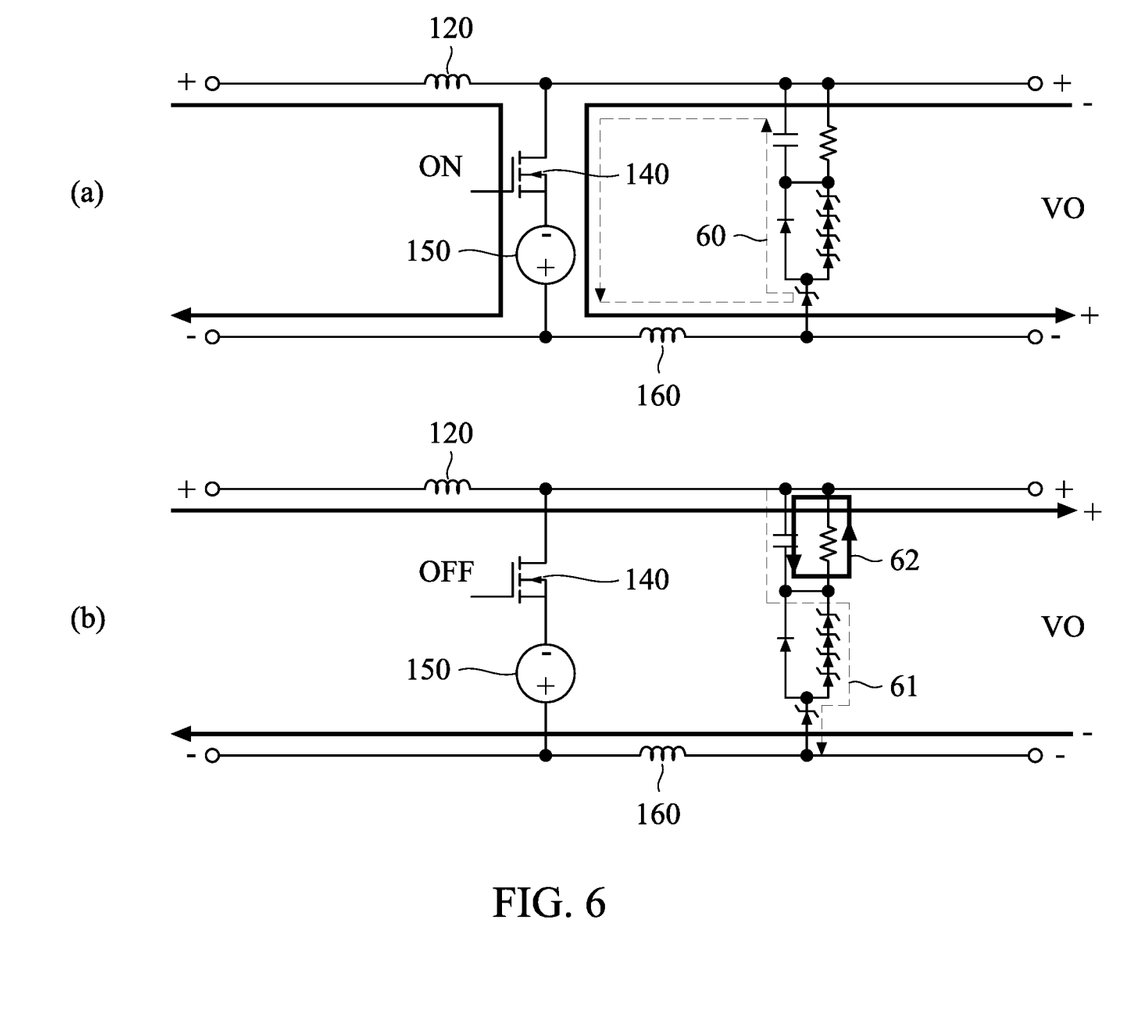
FIG. 6 is a schematic diagram illustrating operations of a power supply device, in accordance with some embodiments of the present disclosure.

Reference is now made to FIG. 6. FIG. 6 is a schematic diagram illustrating operations of the power supply device 500, in accordance with some embodiments of the present disclosure. For the sake of understanding, the same elements in FIG. 6 as those in FIG. 1 and FIG. 5 will be denoted by the same reference marks. The specific operation of similar elements that have been discussed in detail in the above paragraphs is omitted here for the sake of brevity, unless there is a need to explain the cooperative relationship with the elements shown in FIG. 6. In addition, for ease of explanation, the voltage signal converter 110 and the control signal generating circuit 130 are not shown in FIG. 6, and the connection relationship is as shown in the embodiment in FIG. 1. Furthermore, in order to highlight the paths in which the circuit operates, the indications of the capacitor Cs, the resistor Rd, the diodes Dr, D0, and Df1-Df4 will be omitted in FIG. 6, and the connection relationship is the same as that in the embodiment in FIG. 5.

As shown in FIG. 6(a), in some embodiments, when the switch 140 is switched to be turned on, the power supply 150, the capacitor Cs (energy storage element 171), the switch 140, and the diode Dr (the first surge suppressor 172) form a first loop 60. At this time, the diode Dr is turned on caused by forward-biased, and the reverse surge, generated while switching the switch 140, passes through the switch 140, the power supply 150, the diode Dr, and be absorbed by the capacitor Cs. Meanwhile, the supply voltage output from the power supply 150 is outputted between the voltage output terminal n1 and n2.

In another embodiment, as shown in FIG. 6(b), when the switch 140 is switched to be turned off, the capacitor Cs (energy storage element 171), and the diodes Df1-Df4 (the second surge suppressor 173) form a second loop 61.s At this time, the diode DO is reverse-biased and conducted in voltage regulation. The forward surge, generated by switching the switch 140, passes through the capacitor Cs and the diodes Df1-Df4 (the second surge suppressor 173). Meanwhile, the energy storage voltage output from the inductor 120 is outputted between the voltage output terminal n1 and n2. It should be noted that, the number of diodes connected in series in the second surge suppressor 173 can be adjusted to one or more based on the voltage across two terminals of the second surge suppressor 173, in which the second surge suppressor 173 can be implemented by a Zener diode, a transient voltage suppressor or any circuit with high surge protection.

As aforementioned embodiments, when the switch 140 is turned off, the capacitor Cs as the energy storage element 171 is further configured to be coupled to the resistor Rd of the energy release element 174 to form a discharge path 62 in order to release or dissipate the absorbed energy in the capacitor Cs. As shown in FIG. 6(b), the capacitor Cs releases the absorbed energy of the reverse surge through the resistor Rd coupled in parallel thereto. In some embodiments, the power supply device 100 includes the inductor 160. The inductor 160 is coupled between the power supply 150 and the voltage output terminal n2, and configured to cooperate with the energy storage element 171 (i.e., the capacitor Cs) to absorb the reverse surge in the first loop 60 or the forward surge in the second loop 61. It should be noted that, in some other embodiments, the power supply device 100 does not include the inductor 160. In such configuration, an increased capacitance of the capacitor Cs is required to absorb the surge. The resistance of the resistor Rd is correspondingly required to be increased to release the energy absorbed by the capacitor Cs.

Through the operation of the various embodiments described above, the power supply device and the operation method of the present disclosure can provide an adjustable positive voltage in the sputtering system to meet the needs of various applications, through a simple configuration of a single switch and a snubber circuit. At the same time, the snubber circuit can suppress the forward and reverse surge caused by the switch switching, and improve the quality of the sputtering.

While the disclosure has been described by way of example(s) and in terms of the preferred embodiment(s), it is to be understood that the disclosure is not limited thereto. Those skilled in the art may make various changes, substitutions, and alterations herein without departing from the spirit and scope of the present disclosure. In view of the foregoing, it is intended that the present invention cover modifications and variations of this invention provided they fall within the scope of the following claims.

What is claimed is:

1. A power supply device, comprising:
an inductor;
a switch, a first terminal of the switch being coupled to a first terminal of the inductor;
a power supply, a first terminal of the power supply being coupled to a second terminal of the switch; and
a snubber circuit, a first terminal of the snubber circuit being coupled to the first terminal of the switch at a first voltage output terminal, and a second terminal of the snubber circuit being coupled to a second terminal of the power supply at a second voltage output terminal,
wherein the snubber circuit comprises:
an energy storage element;
an energy release element, wherein a first terminal of the energy release element and a second terminal of the energy release element are coupled to, respectively, a first terminal of the energy storage element and a second terminal of the energy storage element;
a reverse surge suppressor, a first terminal of the reverse surge suppressor being coupled to the second terminal of the energy storage element and the second terminal of the energy release element; and
a forward surge suppressor, wherein a first terminal of the forward surge suppressor is coupled to the first terminal of the reverse surge suppressor, and a second terminal of the forward surge suppressor is coupled to a second terminal of the reverse surge suppressor;
wherein the inductor, the switch, the power supply, and the snubber circuit are configured to cooperate to generate an output voltage between the first voltage output terminal and the second voltage output terminal.

2. The power supply device of claim 1, further comprising:
a voltage signal converter, comprising a first converter output terminal and a second converter output terminal, wherein a second terminal of the inductor is coupled to the first converter output terminal, and the second terminal of the power supply is coupled to the second converter output terminal.

3. The power supply device of claim 1, wherein
the first terminal of the energy storage element and a third terminal of the forward surge suppressor are coupled to, respectively, the first voltage output terminal and the second voltage output terminal.

4. The power supply device of claim 1, wherein
when the switch is turned on, the power supply outputs a voltage as the output voltage, the reverse surge suppressor is turned on and the energy storage element absorbs energy through the reverse surge suppressor.

5. The power supply device of claim 1, wherein
when the switch is turned off, a voltage is output as the output voltage from the inductor and the forward surge suppressor is turned on to suppress surge generated while switching the switch.

6. The power supply device of claim 5, wherein
the energy release element is configured to form with the energy storage element a discharge path to dissipate energy absorbed by the energy storage element.

7. The power supply device of claim 1, wherein
the reverse surge suppressor comprises a diode, and the forward surge suppressor comprises at least one diode.

8. The power supply device of claim 7, wherein
the energy storage element comprises a capacitor, and the energy release element comprises a resistor.

9. A power supply device, comprising:
a switch;
a first inductor coupled to the switch, being configured to receive an output voltage from a voltage signal converter and to generate an energy storage voltage;
a power supply coupled to the switch, being configured to provide a supply voltage;
an energy storage element coupled to the switch at a first voltage output terminal;
a first surge suppressor coupled to the energy storage element at a node; and
a second surge suppressor, a first terminal of the second surge suppressor being coupled to the energy storage element at the node;
wherein the first surge suppressor is electrically coupled to, through a second terminal of the second surge suppressor, the power supply at a second voltage output terminal;
wherein when the switch is switched to be turned on, the power supply, the energy storage element, the switch, and the first surge suppressor form a first loop in order to absorb a reverse surge generated while the switch is switched, and the power supply is further configured to output the supply voltage between the first voltage output terminal and the second voltage output terminal;
wherein when the switch is switched to be turned off, the energy storage element and the second surge suppressor form a second loop to absorb a forward surge generated while the switch is switched, and the first inductor is further configured to output the energy storage voltage between the first voltage output terminal and the second voltage output terminal.

10. The power supply device of claim 9, further comprising:

an energy release element, a first terminal of the energy release element and a second terminal of the energy release element being coupled to, respectively, a first terminal of the energy storage element and a second terminal of the energy storage element, wherein the second terminal of the energy release element is coupled to the first terminal of the second surge suppressor at the node.

11. The power supply device of claim 10, wherein the energy release element is configured to form with the energy storage element a discharge path to release energy absorbed by the energy storage element.

12. The power supply device of claim 9, further comprising:

a second inductor, the second inductor being coupled between the power supply and the second voltage output terminal, and being configured to cooperate with the energy storage element to absorb the reverse surge in the first loop or the forward surge in the second loop.

13. The power supply device of claim 9, wherein the second surge suppressor comprises:

a diode, wherein a first terminal of the diode is coupled to a first terminal of the first surge suppressor, and a second terminal of the diode is electrically coupled to the power supply at the second voltage output terminal.

14. The power supply device of claim 9, wherein the switch is configured to be switched in response to a control signal;

wherein when the control signal has a high level to turn on the switch, the power supply outputs a voltage as the supply voltage, and when the control signal has a low level to turn off the switch, the first inductor outputs a voltage, opposite to a polarity of the supply voltage, as the energy storage voltage.

15. An operation method of a power supply device, comprising:

by an inductor, absorbing an output voltage of a voltage signal convertor to output a first voltage signal; and controlling a turn-on state of a switch to selectively output the first voltage signal as an output voltage, or output from an adjustable power supply a second voltage signal as the output voltage, a polarity of the second voltage signal being opposite to the first voltage signal;

wherein when the switch is turned off, an energy storage element and a first surge suppressor are configured to form a first loop to suppress a reverse surge generated while outputting the first voltage signal;

when the switch is turned on, the energy storage element, the switch and a second surge suppressor are configured to form a second loop to suppress a forward surge while outputting the second voltage signal.

16. The method of operating the power supply device of claim 15, wherein controlling the turn-on state of the switch comprises:

transferring a control signal generated by a control signal generating circuit to the switch, wherein the control signal is a pulse width modulation signal.

17. The method of operating the power supply device of claim 16, wherein when the control signal having a high level, the switch is turned on to output, between a terminal of the energy storage element and a terminal of the adjustable power supply, the second voltage signal as the output voltage.

18. The method of operating the power supply device of claim 15, wherein when the switch is turned off, the energy storage element is further configured to be coupled to an energy release element to form a discharge path in order to release the energy absorbed by the energy storage element.

19. The method of operating the power supply device of claim 15, wherein the energy storage element comprises a capacitor, when the adjustable power supply outputs the second voltage signal, the capacitor is configured to absorb energy of the reverse surge.

* * * * *